(12) United States Patent
Sharp et al.

(10) Patent No.: US 11,961,422 B2
(45) Date of Patent: Apr. 16, 2024

(54) RECYCLABLE HEAT SHRINK FILM FOR RECYCLABLE CONTAINER

(71) Applicant: BROOK & WHITTLE LIMITED, Amherst, NY (US)

(72) Inventors: Andrew Sharp, Orchard Park, NY (US); Mitchell J. Morgan, Buffalo, NY (US)

(73) Assignee: BROOK & WHITTLE LIMITED, Amherst, NY (US)

( * ) Notice: Subject to any disclaimer, the term of this patent is extended or adjusted under 35 U.S.C. 154(b) by 0 days.

(21) Appl. No.: 18/103,234

(22) Filed: Jan. 30, 2023

(65) Prior Publication Data

US 2023/0177980 A1     Jun. 8, 2023

Related U.S. Application Data

(63) Continuation of application No. PCT/US2022/029280, filed on May 13, 2022.
(Continued)

(51) Int. Cl.
*G09F 3/00* (2006.01)
*B65D 23/08* (2006.01)
(Continued)

(52) U.S. Cl.
CPC ....... *G09F 3/0291* (2013.01); *B65D 23/0878* (2013.01); *B65B 7/167* (2013.01);
(Continued)

(58) Field of Classification Search
None
See application file for complete search history.

(56) References Cited

U.S. PATENT DOCUMENTS

2003/0068453 A1   4/2003   Kong
2009/0233067 A1   9/2009   Doornheim
(Continued)

FOREIGN PATENT DOCUMENTS

EP   2298665      3/2011
EP   03854839     7/2021
(Continued)

OTHER PUBLICATIONS

JP2007015747A Machine Translation via EPO (Year: 2007).*
(Continued)

*Primary Examiner* — Laura C Powers
(74) *Attorney, Agent, or Firm* — MUETING RAASCH GROUP

(57) ABSTRACT

A recyclable shrink label includes a heat shrink film having a first surface and a second surface opposite of the first surface; and a light blocking layer disposed adjacent the first surface and comprising a light blocking component, the light blocking layer being constructed for the recyclable shrink label to block at least 80% of incident light having wavelengths in a range of 200 nm to 900 nm. The recyclable shrink label may further include an indicia layer. The recyclable shrink label may further include a high opacity layer. The recyclable shrink label may be applied to a container, e.g., a recyclable container. Articles including the recyclable shrink label may be recycled in a process where both the container and the label are recognized as a resin and may be directed into a corresponding recycling stream. In some cases, both the container and the label include PET.

19 Claims, 3 Drawing Sheets

Related U.S. Application Data

(60) Provisional application No. 63/188,794, filed on May 14, 2021.

(51) Int. Cl.
   *G09F 3/02* (2006.01)
   *B65B 7/16* (2006.01)

(52) U.S. Cl.
   CPC ............... *G09F 2003/0208* (2013.01); *G09F 2003/0251* (2013.01); *G09F 2003/0257* (2013.01); *G09F 2003/0272* (2013.01)

(56) References Cited

U.S. PATENT DOCUMENTS

| | | | |
|---|---|---|---|
| 2013/0126462 A1 | 5/2013 | Georgeson | |
| 2016/0136934 A1* | 5/2016 | Mitchell | C08L 45/00 525/216 |
| 2017/0223879 A1* | 8/2017 | Mitchell | B65D 85/80 |

FOREIGN PATENT DOCUMENTS

| | | | | | |
|---|---|---|---|---|---|
| JP | 2004114498 | A | * | 4/2004 | ............ B29C 55/12 |
| JP | 2007015747 | A | * | 1/2007 | |
| JP | 2009214535 | A | * | 9/2009 | |
| WO | WO-2006076327 | A1 | * | 7/2006 | ............ B32B 15/08 |
| WO | WO 2015/026479 | | | 2/2015 | |

OTHER PUBLICATIONS

JP2009-214535A Machine Translation via EPO (Year: 2009).*
JP 2004-114498A Machine Translation via EPO (Year: 2004).*
Written Translation of Table 2 JP 2009214535A via STIC translation services (Year: 2009).*
PCT Search Report and Written Opinion for PCT/US2022/029280 dated Aug. 11, 2022 (9 pages).
Shrink Sleeve Labels on PET Containers APR Resource Document, The Association of Plastic Recyclers, Jan. 4, 2021, 10 pages.
Benchmark Evaluation for Clear PET Articles with Labels and Closures, The Association of Plastic Recyclers, Apr. 11, 2019 (7 pages).
Critical Guidance Protocol for Clear PET Articles with Labels and Closures, The Association of Plastic Recyclers, Aug. 17, 2021 (11 pages).
Evaluation of the Near Infrared (NIR) Sorting Potential of a Whole Plastic Article, The Association of Plastic Recyclers, May 15, 2018 (15 pages).
Evaluation of Sorting Potential for Plastic Articles Utilizing Metal, Metalized, or Metallic Printed Components, The Association of Plastic Recyclers, May 15, 2018 (10 pages).

* cited by examiner

RECYCLABLE HEAT SHRINK FILM FOR RECYCLABLE CONTAINER

RELATED APPLICATIONS

The present application is a continuation application of International Application No. PCT/US2022/029280 filed 13 May 2022, which claims priority to U.S. Provisional Patent Application No. 63/188,794, filed on 14 May 2021, which are incorporated herein in their entireties.

BACKGROUND

The consumer packaged-goods markets globally aspire to utilize recyclable packaging for most products. Clear PET packaging provides a cost effective recyclable option. The dairy, food, nutraceutical, and other markets also require light protective packaging to block ingredient harmful light waves from impacting the shelf life and performance of those products. Traditionally, color impregnated bottles or containers, and/or white shrink films printed with or sometimes without functional light blocking layers are used to block the harmful light waves. The market for recycling color impregnated PET is very small and most of those bottles and containers are not recycled.

Therefore, there remains a need for recyclable, light protective packaging options for many markets, including the food and nutraceutical markets.

Any discussion of prior publications and other prior knowledge does not constitute an admission that such material was published, known, or part of the common general knowledge.

SUMMARY

Disclosed herein are recyclable shrink labels.

According to an embodiment, a recyclable shrink label includes a heat shrink film having a first surface and a second surface opposite of the first surface; and a light blocking layer disposed adjacent the first surface and comprising a light blocking component, the light blocking layer being constructed for the recyclable shrink label to block at least 80% of incident light having wavelengths in a range of 200 nm to 900 nm. The heat shrink film may have a thickness from 15 µm to 100 µm or 30 µm to 80 µm.

The recyclable shrink label may further include an indicia layer. The indicia layer may be disposed on the first surface. The recyclable shrink label may further include a high opacity layer. The high opacity layer may include a white pigment. The high opacity layer may be disposed between the indicia layer and the light blocking layer.

The heat shrink film may include or be made of polyester, polyolefin, or a combination thereof. In some cases, the heat shrink film includes or is made of polyethylene terephthalate (PET), polyethylene terephthalate glycol-modified (PETG or PET-G), polyvinyl chloride (PVC), polystyrene or oriented polystyrene (OPS), polylactic acid (PLA), polypropylene (PP), polyethylene (PE), or a combination thereof. In some cases, the heat shrink film consists of polyethylene terephthalate (PET), polyethylene terephthalate glycol-modified (PETG or PET-G), polyvinyl chloride (PVC), polystyrene or oriented polystyrene (OPS), polylactic acid (PLA), polypropylene (PP), polyethylene (PE), or a combination thereof. In some cases, the heat shrink film consists of polyethylene terephthalate (PET).

When heated to 100° C., the heat shrink film may contract or shrink by about 1% to about 90%. The heat shrink film may contract of shrink by about 1% to 90% in the transverse direction. When the heated to 100° C., the entire recyclable shrink label may contract or shrink by about 1% to about 90%. The entire recyclable shrink label may contract of shrink by about 1% to 90% in the transverse direction.

The high opacity layer may include a pigment selected from titanium dioxide (TiO2), precipitated calcium carbonate (PCC), aluminum silicate, aluminum oxide (alumina), mica-based pigments coated with thin layer(s) of white pigment, or a combination thereof.

The light blocking component may include a metal particulate. The metal particulate may have a particle size of 0.1 µm to 100 µm. The light blocking component may include or consist of zinc, aluminum, copper, silver, or an alloy thereof, titanium dioxide, carbon black, mica, a reflective pigment, a polymer capable of blocking light, a mineral capable of blocking light, or a combination thereof. The light blocking layer may be present on the label in an amount of 0.5 ppr to 25 ppr. The light blocking component may be present at 0.1 ppr to 10 ppr, from 0.2 ppr to 5 ppr, or from 0.3 ppr to 3 ppr.

According to an embodiment, an article includes a container comprising an external surface; and the recyclable shrink label described above, disposed on the container. In some embodiments, the first surface of the heat shrink film faces the external surface of the container. The container may include or be made of polymer, glass, metal, or a combination thereof. The container may include or be made (e.g., consist of) polyethylene terephthalate (PET). The container may include or be made (e.g., consist of) clear polyethylene terephthalate (PET). The recyclable shrink label may include or be made polyethylene terephthalate (PET). In some cases, the polyethylene terephthalate (PET) forms the outermost layer of the recyclable shrink label.

According to an embodiment, a method of making a label for a container includes depositing an indicia layer on a heat shrinkable film; optionally depositing a high opacity layer on the indicia layer; and depositing a light blocking composition on the indicia layer, on the heat shrinkable film, or on the high opacity layer, wherein the light blocking layer includes one or more light blocking components, and wherein the label is capable of blocking at least 80% of incident light having wavelengths in a range of 200 nm to 900 nm.

According to an embodiment, a method of recycling an article including a container defining an external surface; and the recyclable shrink label described above, disposed on the container, optionally with the first surface facing the external surface of the container, the method including: determining that the container and recyclable shrink label comprise polyethylene terephthalate (PET); directing the article into a polyethylene terephthalate (PET) recycling stream; and washing the article to remove inks and pigments from the recyclable shrink label. The washed article may be clear and not be stained by the light blocking component or other pigments or inks. The article may be washed in a caustic bath. The article may be chopped into pieces prior to washing. According to an embodiment, during the recycling process, the inks and coating layers cleanly separate from the PET heat shrink film, allowing pure PET to be recovered and processed into reusable resin.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

Definitions

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

The term "comprises" and variations thereof do not have a limiting meaning where these terms appear in the description and claims. Such terms will be understood to imply the inclusion of a stated step or element or group of steps or elements but not the exclusion of any other step or element or group of steps or elements.

By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The term "substantially" as used here has the same meaning as "nearly completely," and can be understood to modify the term that follows by at least about 90%, at least about 95%, or at least about 98%. The term "not substantially" as used here has the same meaning as "not significantly," and can be understood to have the inverse meaning of "substantially," i.e., modifying the term that follows by not more than 10%, not more than 5%, or not more than 2%.

Unless otherwise specified, "a," "an," "the," and "at least one" are used interchangeably and mean one or more than one.

As used herein, the term "or" is generally employed in its usual sense including "and/or" unless the content clearly dictates otherwise.

The term "and/or" means one or all of the listed elements or a combination of any two or more of the listed elements.

Any reference to standard methods (e.g., ASTM, TAPPI, AATCC, etc.) refer to the most recent available version of the method at the time of filing of this disclosure unless otherwise indicated.

Also herein, the recitations of numerical ranges by endpoints include all numbers subsumed within that range (e.g., 1 to 5 includes 1, 1.5, 2, 2.75, 3, 3.80, 4, 5, etc.).

Herein, "up to" a number (for example, up to 50) includes the number (for example, 50).

The term "in the range" or "within a range" (and similar statements) includes the endpoints of the stated range.

For any method disclosed herein that includes discrete steps, the steps may be conducted in any feasible order. And, as appropriate, any combination of two or more steps may be conducted simultaneously.

All headings are for the convenience of the reader and should not be used to limit the meaning of the text that follows the heading, unless so specified.

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

Unless otherwise indicated, all numbers expressing quantities of components, molecular weights, and so forth used in the specification and claims are to be understood as being modified in all instances by the term "about." As used herein in connection with a measured quantity, the term "about" refers to that variation in the measured quantity as would be expected by the skilled artisan making the measurement and exercising a level of care commensurate with the objective of the measurement and the precision of the measuring equipment used. Accordingly, unless otherwise indicated to the contrary, the numerical parameters set forth in the specification and claims are approximations that may vary depending upon the desired properties sought to be obtained by the present invention. At the very least, and not as an attempt to limit the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. All numerical values, however, inherently contain a range necessarily resulting from the standard deviation found in their respective testing measurements.

The terms "polymer" and "polymeric material" include, but are not limited to, organic homopolymers, copolymers, such as for example, block, graft, random, and copolymers, terpolymers, etc., and blends and modifications thereof. Furthermore, unless otherwise specifically limited, the term "polymer" shall include all possible geometrical configurations of the material. These configurations include, but are not limited to, isotactic, syndiotactic, and atactic symmetries.

The term "copolymer" refers to polymers containing two or more different monomeric units or segments, including terpolymers, tetrapolymers, etc.

As used herein, the term "ink" refers to a colored material for writing and printing. Generally, ink has four main ingredients: (1) colorant, which is composed of a pigment, dye, or mixture of pigments and/or dyes which define the color of the colorant, (2) resin, which is a binder that can be soluble or in a solvent and the binder holds the colorant on a substrate, (3) optionally solvent or water to dissolve the resin (the solvent or water is removed after printing onto the label), and (4) optionally additives to adjust properties of the ink. Pigments can be organic and inorganic substances. Inks herein can be differentiated as metallic inks and non-metallic inks. As used herein, the term "metallic ink" refers to an ink to which metal flakes or powder are added as a pigment additive to the ink. Metallic inks when printed can appear to be reflective or shiny. Therefore, "non-metallic ink" herein referred to inks without such metal flakes or powder components.

As used herein, the term "opaque" refers to a substrate or printed substrate that has an opacity greater than or equal to 50%.

As used herein, the term "opacity" refers to the property of a substrate or printed substrate which measures the capacity of the substrate to hide or obscure from view an object placed behind the substrate relative to the point from which an observation is made. Opacity can be reported as the ratio, in percent, of the diffuse reflectance of a substrate backed by a black body having a reflectance of 0.5% to the diffuse reflectance of the same substrate backed with a white body having an absolute reflectance of 89%. Opacity can be measured as described in ASTM D 589-97, Standard Test Method for Opacity of Paper (15°/Diffuse Illuminant A, 89% Reflectance Backing and Paper Backing). A substrate high in opacity will not permit much, if any, light to pass through the substrate. A substrate having low opacity will permit much, if not nearly all, light to pass through the substrate. Opacity can range from 0 to 100%. As used herein, the term "low opacity" refers to a substrate or printed substrate having opacity less than 50%. As used herein, the term "high opacity" refers to a substrate or printed substrate having opacity greater than or equal to 50%.

As used herein, the term "indicia" refers to markings or indications that can be used to convey a message. The message conveyed can be an indication of source, the characteristics of a product in a package, the quantity of a product in a package, the quality of a product in a package, or any other message. Indicia can be a symbol such as a graphic resembling a target used for training archers to indicate a particular retail store. Indicia can be text in any language or combination of languages representative of verbal communication. Indicia can be patterns of colors, lines, or combinations thereof. Indicia can be illustrations of tangible objects such as an apple indicating the source of a particular brand of computer. Indicia can be artwork depicting tangible objects or imaginary compositions or any kind of marking. A single dot of a single color can be indicia. Indicia can be the type, texture, smell, or sound when rustled of the material used to form a package. Indicia can be a combination of any and all of the indicia described previously.

As used herein, the term "ppr" refers to pounds per ream and is used as the unit of measurement of dry pounds of ink or coating per area of substrate (e.g., film or label). One ream is understood to mean 3000 sq ft (about 289 m$^2$).

As used herein, the term "BCM" refers to billion cubic microns per square inch ($\mu m^3/inch^2$) and is used as a unit of measurement of liquid volume of ink or coating.

As used herein, the term "line-screen" refers to how many halftone lines are printed per each linear inch.

As used herein, the term "viscosity" refers to the flowrate of a liquid and is measured using a calibrated #2 Zahn viscosity cup.

As used herein, the term "COF" refers to the kinetic and static coefficient of friction values. COF can be measured as described in ASTM D1894-14 Standard Test Method for Static and Kinetic Coefficients of Friction of Plastic Film and Sheeting.

BRIEF DESCRIPTION OF THE FIGURES

The disclosure will be further explained with reference to the drawings, wherein.

These figures, which are idealized, are not to scale and are intended to be merely illustrative and non-limiting.

DETAILED DESCRIPTION OF ILLUSTRATIVE EMBODIMENTS

Figure 1A:
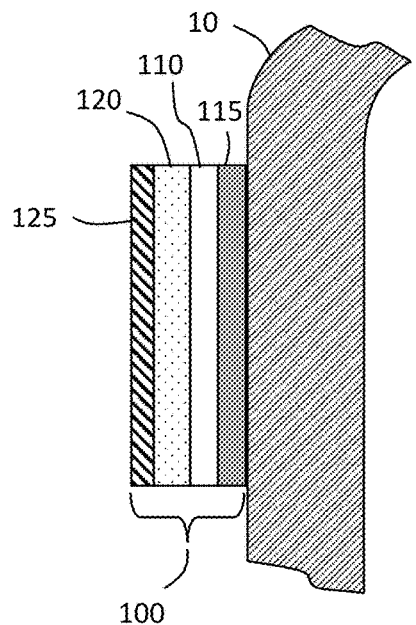
FIG. 1A schematically depicts an embodiment of a disclosed article according to an embodiment.

The present disclosure relates to labels that are opaque and recyclable. The present disclosure further relates to shrinkable labels that are opaque and recyclable.

The term label is used here broadly. Although many embodiments described herein may be characterized as shrink sleeves, the disclosure and the term label are not limited to such embodiments only. The label may cover at least some clear or transparent parts of a package. The label may serve to block light from reaching a product inside the package. The label may be used to provide graphic elements and information about the product, such as product information required by law, if applicable (e.g., ingredient list and/or nutritional facts).

According to an embodiment, the labels of the present disclosure have a layered construction. The layered construction may include one or more shrink film layers and one or more light blocking (opaque) layers. The layered construction may further include other layers, such as additional polymeric layers, indicia, adhesive layers, a slip coat, a protective top layer, another functional layer, or a combination thereof. Such additional layers may be placed between the shrink film, indicia layer, high opacity layer, or light blocking layer, or on the outside of any such layers. The shrink film has a first surface and a second surface opposite of the first surface. When the label is applied onto a container (e.g., a bottle), the first surface may be the side facing the container and the second surface may face the outside of the container. The light blocking layer may be disposed adjacent the first surface. That is, generally, the light blocking layer may be disposed between the shrink film and the container. The other layers, if included, may be disposed adjacent the first surface or the second surface. The term "adjacent" is used here to indicate which the side of the label the layer is closest. Additional optional layers may be disposed between adjacent layers. The term "immediately adjacent" is used to indicate that the layers in question are in contact with one another and there are no intervening layers.

It is desirable that the label blocks light (e.g., ambient light and sun light, e.g., from 200 nm to 900 nm) such that the contents of a container covered by the label can be protected from light. It is further desirable that the label is recyclable. Generally clear crystallizable heat shrink films (e.g., PET shrink films) are considered recyclable if no inks are retained on the film after a caustic wash cycle typically used in PET reclaiming processes.

Previously, white PET films with a black coating printed on the inside of the label were the only shrink label solution that met the desirable light blocking thresholds. White PET cannot be recycled with clear PET bottles or containers and therefore those products are not recycled and go to the landfill. According to an embodiment, the labels of the present disclosure are light blocking and offer the ability to maintain and improve product shelf life with a light blocking clear shrink film while preserving the recyclability of the clear PET package.

According to an embodiment, the inks utilized in the labels of the present disclosure, including the light blocking inks, are designed to wash off the film during a reclaiming process allowing the labels and containers they cover to be recycled.

Further according to an embodiment, the labels of the present disclosure allow the use of a clear PET underlying container or bottle, which preserves the recyclability of the container or bottle. The labels may also potentially reduce or remove the need to include any additional additives in the container itself (e.g., pigments). For example, the labels may be used on clear, rigid PET containers and bottles. Any inks and coatings printed onto the PET shrink film may be formulated to wash off the film during the recycling process, allowing the underlying clear PET film and the clear PET rigid plastic to be recycled together. The inks and coatings may be formulated to group together during the wash off process in a coagulation-like reaction, which prevents or reduces the ink and coatings from staining the clear film and rigid PET that resides at the bottom of the PET caustic recycling bath process. For example, the inks and coatings may be crosslinked and/or have additives that help the smaller particles glomerate into larger particles during the wash off process. Such larger particles can then be filtered out of the wash water, helping to prevent staining of the PET film and clear PET rigid plastic.

Films

According to an embodiment, the label includes a heat shrinkable film or heat shrink film. The terms heat shrink film and shrink film are used here interchangeably. Any suitable heat shrink film may be used. In some embodiments, the heat shrink film is a polyester heat shrink film, of the type that is used in the packaging industry. The heat shrink film can also be described as a film that is not heat stabilized so that it will shrink when exposed to heat.

The heat shrink film is a polymeric film that is substantially two-dimensional with two major surfaces. The term substantially two-dimensional is used to refer to an object having a significantly large size measurement in two dimensions compared to a significantly small size measurement in the third dimension (e.g., the thickness). In some embodiments, useful heat shrink films or articles including such heat shrink films shrink from 1% to 90% in the transverse direction (TD) and up to 10% in the machine direction (MD). In some embodiments, useful heat shrink films or articles including such heat shrink films shrink from 1% to 90% in the machine direction and up to 10% in the transverse direction. As used herein, transverse direction means a direction perpendicular to the direction of working. As used herein, machine direction means a direction parallel to the direction of working.

The composition of the heat shrink film, whether two- or three-dimensional, is not particularly limited and can comprise high- or low-density polymers, or combinations thereof. Low density polymers that have a density of less than 1 $g/cm^3$ may be preferred. Such low densities allow for water flotation separation from a denser substrate during recycling processes. In some embodiments, the label includes a heat shrink film having a density of 1 $g/cm^3$ or less.

According to an embodiment, the label includes a heat shrink film having a thickness of 15 μm or greater, 30 μm or greater, 35 μm or greater, 37 μm or greater, 40 μm or greater, 45 μm or greater, 50 μm or greater, or even 60 μm or greater. The preferred heat shrinkable film is comprised of a film having a thickness of not greater than 100 μm or less, 90 μm or less, 90 μm or less, 85 μm or less, 80 μm or less, 75 μm or less, 70 μm or less, 65 μm or less, or even 60 μm or less. In some embodiments, the heat shrink film has a thickness ranging from 15 μm to 100 μm, 30 μm to 80 μm, 40 μm to 60 μm, or even 40 μm to 55 μm.

According to an embodiment, the label includes a heat shrink film that shrinks when heated to or above a shrink initiation temperature. The shrink initiation temperature may be above 22.5° C. or in the range from about 40° C. to about 200° C. Shrinkage of heat shrink films is typically measured using a hot water bath method, where the film is immersed in a heated water bath for 10 seconds. The measurement may be repeated at different temperatures, such as at 100° C. and 80° C. Shrinkage may be reported at a given temperature, or shown as a shrink curve. Shrinkage numbers here are given as measured at 100° C. When heated to 100° C., the heat shrink film shrinks 1% or more, 2% or more, 5% or more, 10% or more, 20% or more, 30% or more, 40% or more, or 50% or more of the size it was before heating. When heated to 100° C., the heat shrink film shrinks 90% or less, 80% or less, 75% or less, 70% or less, or 50% or less of the size it was before heating. When heated to 100° C., the heat shrink film may shrink from 1% to 90%, from 2% to 80%, or from 5% to 70%. The shrinkage may be in the machine direction, the transverse direction, or both. In some embodiments, the heat shrink film shrinks primarily in the transverse direction only. In some embodiments, the heat shrink film shrinks primarily in the machine direction only.

In some embodiments, the polymeric films useful in the label possess balanced shrink properties. The balanced shrink properties allow the film to tighten darts and wrinkles initially formed in the label when the label is applied over curved surfaces and allow the darts and wrinkles to be wiped down with minimal graphics distortion of the label. In some embodiments, the films used in the label have unbalanced shrink properties. Films having unbalanced shrink, that is, films having a high degree of shrink in one direction and low to moderate shrink in the other direction may be particularly useful. In some embodiments, particularly useful films are those that have one dimensional shrink (e.g., in the transverse direction) because they may provide the ability to pre distort indicia formed thereon more easily versus those that have biaxial shrinkage. In some embodiments, the film may be used in a process called "roll-on-shrink-on," where the film shrinks primarily in the machine direction.

Preferably, the shrink film is thermally shrinkable and yet has sufficient stiffness (e.g., modulus) to be dispensed using conventional labeling application equipment and converting processes, including treating, printing, coating, slitting, seaming, cutting, and label application. The desired stiffness of the film depends on the size of the label, the speed of application, the shape and moisture content on the surface of the container, and the labeling equipment being used.

The shrink film may be made by conventional processes. For example, the shrink film may be produced using blown, calendared, or tentered extrusion processes.

The shrink film useful in the label may be a single layer construction or a multilayer construction. The layer or layers of the shrink film may be formed from a polymer chosen from numerous types of polymers, including for example polyesters and polyolefins. Illustrative specific polymers or polymer types that can be utilized to form shrink films can include, for example, polyethylene terephthalate (PET), polyethylene terephthalate glycol-modified (PETG or PET-G), polyvinyl chloride (PVC), polystyrene or oriented polystyrene (OPS), polylactic acid (PLA), copolymers, non-petroleum based biopolymers, and copolymers and blends thereof. Additional illustrative specific types of polymers that can be utilized to form shrink films can include, polyolefins, such as polypropylene (PP), polyethylene (PE), and copolymers and blends thereof. In some embodiments, illustrative specific copolymers can include copolymers of PP and PE, for example. In a preferred embodiment, the shrink film includes polyethylene terephthalate (PET) and is recyclable with PET bottles. In some embodiments, the shrink film consists of polyethylene terephthalate (PET).

Shrink films are typically polymeric films that are applied over or around a substrate or, for example, a container (e.g., a bottle, jar, tube, or the like) or multiple containers (e.g., a multipack of containers). Two portions (e.g., two edges) of the film can be bonded together to form a seal or seam that results in a sleeve or tube configuration. When heated to 100° C., the shrink film contracts or shrinks by 1% or more, 2% or more, 5% or more, 10% or more, 20% or more, 30% or more, 40% or more, or 50% or more. When heated to 100° C., the shrink film may contract or shrink by 90% or less, 80% or less, 75% or less, 70% or less, or 50% or less of the size it was before heating. The shrink film may contract or shrink 1% to 90%, from 2% to 80%, or from 5% to 70% upon heating to or above the shrink initiation temperature. The shrinkage may be in the machine direction, the transverse direction, or both. In some embodiments, the heat shrink film shrinks primarily in the transverse direction only. In some embodiments, the heat shrink film shrinks primarily in the machine direction only. The amount that a shrink film shrinks can be largely dependent or may be chosen based on the container which it is to be shrunk around. The film shrinks to conform to the contours of the underlying article. In one embodiment, the shrink film is microperforated to allow trapped air to be released from the interface between the label and the article to which it is adhered. In another embodiment, the shrink film is permeable to allow fluid to escape from the adhesive or from the surface of the article. In one embodiment, vent holes or slits are provided in the shrink film. In some embodiments, perforations, pin holes, or such features may desirably be avoided in order to maximize light blocking characteristics.

The layers of the shrink film, or layers applied to the shrink films may optionally contain pigments, fillers, stabilizers, light protective agents, or other suitable modifying agents if desired.

The shrink film may have any suitable color. However, for recyclability, useful shrink films may specifically include clear shrink films and white shrink films (e.g., white floatable films). Clear shrink films may be made white by including an additional layer or layers that includes a pigment that makes the heat shrink film appear white when viewed. White shrink films may also be made by adding white pigments during the extrusion or formation process for example.

Useful shrink films may also contain a layer of an ink-receptive composition that enhances the printability of the shrink film, and the quality of the print layer thus obtained. A variety of such compositions are known in the art, and these compositions generally include a binder and a pigment, such as silica or talc, dispersed in the binder. The presence of the ink-receptive composition may decrease the drying time of some inks. Such ink-receptive compositions are described in U.S. Pat. No. 6,153,288 (Shih et al.) and the disclosure of this patent is hereby incorporated by reference.

The adhesion of the ink to the surface of the polymeric shrink film can be improved, if necessary or desired, by techniques well known to those skilled in the art. For example, as mentioned above, an ink primer or other ink adhesion promoter can be applied to the surface layer of the shrink film before application of the ink. Alternatively, the surface of the shrink film can be treated by methods such as corona treated or flame treated, for example, to improve the adhesion of the ink to the polymeric film layer.

Useful ink primers may be transparent or opaque and the primers may be solvent based, water-based, or UV-based, digital printing ink diluted with known solvents and/or additives to achieve a desired viscosity for the specific printing process. In one embodiment, the primers are radiation curable (e.g., UV). The ink primer may comprise a lacquer and a diluent. The lacquer may be comprised of one or more polyolefins, polyamides, polyesters, polyester copolymers, polyurethanes, polysulfones, polyvinylidene chloride, styrene-maleic anhydride copolymers, styrene-acrylonitrile copolymers, ionomers based on sodium or zinc salts or ethylene methacrylic acid, polymethyl methacrylates, acrylic polymers and copolymers, polycarbonates, polyacrylonitriles, ethylene-vinyl acetate copolymers, and mixtures of two or more thereof. Examples of the diluents that can be used include alcohols such as ethanol, isopropanol and butanol; esters such as ethyl acetate, propyl acetate and butyl acetate; aromatic hydrocarbons such as ketones such as acetone and methyl ethyl ketone; aliphatic hydrocarbons such as heptane; and mixtures thereof. The ratio of lacquer to diluent is dependent on the viscosity desired for application of the ink primer, the selection of such viscosity being within the skill of the art. The ink primer layer may have a thickness of from about 0.5 μm to about 20 μm, about 1 μm to about 4 μm, or from about 1.5 μm to about 3 μm.

A transparent or non-transparent polymer topcoat or overcoat layer may be present in the labels of the present disclosure. The topcoat or overcoat layer could provide desirable protective properties to the label before and after the label is affixed to an article, such as a container. The presence of a transparent or non-transparent topcoat layer over the print layer may, in some embodiments, provide additional properties such as antistatic properties, stiffness, and/or weatherability, and the topcoat may protect the print layer from, e.g., weather, sun, abrasion, moisture, water, etc. The transparent or non-transparent topcoat layer can enhance the properties of the underlying print layer to provide a glossier and richer image. The transparent or non-transparent topcoat layer could change the aesthetics of the underlying print layer or label (e.g., matte finish or soft touch finish). The protective transparent protective layer may also be designed to be abrasion resistant, radiation resistant (e.g., UV resistant), chemically resistant, thermally resistant, thereby protecting the label and, particularly the print layer from degradation from such causes. The overcoat may also contain antistatic agents or anti-block agents to provide for easier handling when the labels are being applied to containers at high speeds. The layer may be applied to the print layer by techniques known to those skilled in the art. The polymer film may be deposited from a solution or applied as a preformed film (laminated to the print layer), or by any other suitable means known in the art.

When a transparent or non-transparent topcoat or overcoat layer is present, it may have a single layer or a multilayered structure. The thickness of the protective layer is generally in the range of about 1 μm to about 125 μm, about 12.5 μm to about 125 μm, and in one embodiment about 25 μm to about 75 μm. Examples of topcoat layers are described in U.S. Pat. No. 6,106,982 (Mientus et al.) which is incorporated herein by reference.

The topcoat or overcoat layer may comprise polyolefins, thermoplastic polymers of ethylene or propylene, polyesters, polyurethanes, polyacryls, polymethacryls, epoxy, vinyl acetate homopolymers, co- or terpolymers, ionomers, and mixtures thereof.

The transparent topcoat or overcoat may contain UV light absorbers and/or other light stabilizers. Suitable UV light absorbers include those available from BASF under the trade designations "Tinuvin" and "Chimassorb," for example Tinuvin 111, Tinuvin 123, Tinuvin 622, Tinuvin 770, Tinuvin 783, Chimassorb 119, and Chimassorb 944. The concentration of the UV light absorber and/or light stabilizer is in the range of up to about 2.5% by weight of the transparent protective layer and in one embodiment about 0.05% to about 1% by weight. However, in some embodiments, the transparent topcoat or overcoat does not include a UV light absorber or stabilizer.

The transparent topcoat or overcoat layer may contain an antioxidant. Any antioxidant useful in making thermoplastic films can be used.

According to an embodiment, an exemplary label includes clear recyclable shrink PET film having an optional anti-static coating, high TD shrinkage, low MD shrinkage, very low shrink force, and gradual shrink curve. According to an embodiment, the labels of the present disclosure can meet certain industry standards, including for example the Association for Plastic Recyclers (APR) Critical Guidance Protocol for Clear PET Articles with Labels and Closures (PET-CG-02), which can be considered as certifying that the film is fully recyclable with the container or bottle. In some embodiments, the labels of the present disclosure are recyclable according to Evaluation of the Near Infrared (NIR) Sorting Potential of a Whole Plastic Article (SORT-B-01), Evaluation of Sorting Potential for Plastic Articles Utilizing Metal, Metalized or Metallic Printed Components (SORT-B-03), or both. That is, according to an embodiment, the labels of the present disclosure are fully recyclable. For example, the labels may include inks that can be washed off in a typical PET recycling wash (caustic wash) and the polymers used in the labels are preferably clear (preferably clear PET). According to an embodiment, the labels are free or substantially free of inks that cannot be washed off in a caustic wash. According to an embodiment, the labels are free or substantially free of colored plastics (including white plastics) that cannot be recycled.

High Opacity Coating Compositions

According to an embodiment, the label includes a high opacity layer formed from a high opacity coating composition. In some embodiments where clear shrink films are used, it may be useful for disclosed articles to include an optional high opacity layer applied thereon or on a layer applied onto the clear shrink film. The high opacity layer may be applied by applying a high opacity coating composition to one or more layers of the label.

Useful high opacity coating compositions can include aqueous or non-aqueous ink compositions. In some embodiments, the high opacity coating composition includes a white pigment. Examples of useful white pigments include, for example, titanium dioxide ($TiO_2$), precipitated calcium carbonate (PCC), aluminum silicate, aluminum oxide (i.e., alumina), mica-based pigments coated with thin layer(s) of white pigment (such as $TiO_2$), and combinations thereof.

In some embodiments, a high opacity coating composition can include a white pigment, an anionic surfactant, latex particles, and a balance of water. In other instances, high opacity coating composition can include additives, such as an optical brightener, a biocide, additional surfactant, a co-solvent, and/or a humectant.

Useful high opacity coating compositions can include compositions formulated for use as rotogravure inks (e.g., rotogravure solvent-based inks), flexographic inks, lithographic inks, or digital printing inks (e.g., ink jet, nanographic), for example.

The high opacity coating composition can be placed on the shrink film using any methods known in the art including but not limited to gravure printing (e.g., rotogravure printing), flexographic printing, and lithographic printing (e.g., offset lithographic), plateless printing (e.g., digital), post press applications, and screen printing for example. Gravure printing is the direct transfer of liquid ink to substrate from a metal image carrier. The image is lower than the surface of the image carrier base. Flexographic printing is the direct transfer of liquid ink to substrate, typically from a photopolymer image carrier although other image carriers exist. The image is raised above the surface of the image carrier base. Offset lithographic printing is the indirect transfer of paste ink to substrate from a rubber 'blanket' that is intermediate to substrate and the thin planographic metal image carrier. Some examples of plateless printing include liquid toner electrophotography, dry toner electrophotography, drop on demand inkjet, continuous inkjet, or NANOGRAPHY™.

In embodiments where the high opacity coating composition is applied to the shrink film or layer on the shrink film via rotogravure coating or printing, the high opacity coating composition can have a viscosity from 16 seconds to 40 seconds, from 16 seconds to 25 seconds, or from 19 seconds to 24 seconds, measured with a #2 Zahn Cup, for example.

In embodiments where the high opacity coating composition is applied to the shrink film or layer on the shrink film via gravure coating or rotogravure coating, the high opacity coating composition can be applied using a one or more rotogravure cylinders. The cylinder(s) may be adjusted to provide a desired amount of coating composition on the surface of the shrink film or layer. The cylinder(s) may have a cell volume of 1.0 BCM or greater, 5 BCM or greater, 10 BCM or greater, or 15 BCM or greater. The cell volume may be 2 BCM or less, 25 BCM or less, or 20 BCM or less. The cell volume may range, for example, from 1.0 BCM to 30.0 BCM, or from 5 BMC to 25 BCM. The cylinder(s) may have cell width values of 25 μm or greater, 50 μm or greater, or 100 μm or greater. The cylinder(s) may have cell width values of 300 μm or less, 250 μm or less, or 200 μm or less. The cell width values may range, for example, from 25 μm to 300 μm. The cylinder(s) may have channel widths of 1 μm or greater, 5 μm or greater, 10 μm or greater, 20 μm or greater, or 30 μm or greater. The channel widths may be 75 μm or less or 50 μm or less. The channel widths may range from 1 μm to 75 μm. The cylinder(s) may have line screen values of 25 LPI or greater, 50 LPI or greater, 100 LPI or greater, 150 LPI or greater, or 200 LPI or greater. The line screen values may be 400 LPI or less, 350 LPI or less, 300 or less, 250 or less, or 200 or less. The line screen values may range from 25 LPI to 400 LPI. According to exemplary embodiments, a desired dry coat weight may be 0.5 ppr or greater, 1 ppr or greater, 5 ppr or greater, 10 ppr or greater, or 15 ppr or greater. The desired dry coat weight may be 25 ppr or less, 20 ppr or less or 15 ppr or less. The desired dry coat weight may range from 0.5 ppr to 25 ppr.

Application of the high opacity coating composition onto the shrink film or onto a layer on the shrink film forms a high opacity layer. The high opacity layer need not be constant, continuous, or complete across the entirety of the shrink film. In some embodiments, the high opacity layer forms a pattern of discrete dots of ink. In other embodiments, the high opacity layer forms a continuous layer of ink.

Light Blocking Layer

According to an embodiment, the label includes a layer of light blocking material, such as light blocking ink. The light blocking material may be applied onto the shrink film or on a layer applied onto the shrink film, including for example onto the high opacity layer discussed above. The light blocking material may be applied in the form of a light blocking composition that includes one or more light blocking components.

According to an embodiment, the label containing the light blocking layer blocks at least 80%, at least 90%, at least 95%, at least 96%, at least 98%, at least 99%, or even almost 100% or 100% of incident light having wavelengths from 200 nm to 900 nm. According to an embodiment, the label containing the light blocking layer blocks at least 95%, at least 96%, at least 98%, at least 99%, at least 99.5%, about 100%, or 100% of incident light having wavelengths from 220 nm to 800 nm. According to an embodiment, the label containing the light blocking layer blocks at least 98%, at least 99%, at least 99.5%, about 100%, or 100% of incident light having wavelengths from 220 nm to 750 nm. According to an embodiment, the label containing the light blocking layer blocks at least 99%, at least 99.5%, about 100%, or 100% of incident light having wavelengths from 220 nm to 600 nm. According to an embodiment, the label containing the light blocking layer blocks at least 99%, at least 99.5%, about 100%, or 100% of incident light having wavelengths from 220 nm to 500 nm. According to an embodiment, the label containing the light blocking layer blocks at least 99%, at least 99.5%, about 100%, or 100% of incident light having wavelengths from 220 nm to 450 nm. The amount of light blocked by the label may be measured using a UV-Vis spectrophotometer, such as the Shimadzu model UV-2600i.

According to an embodiment, the label includes a light blocking layer containing one or more light blocking components. In some embodiments, the light blocking components include one or more metals. In some embodiments, useful light blocking components can include pigments that are encapsulated with a metal or metal containing compound. Examples of light blocking components include but are not limited to organic and inorganic pigments, e.g., metallic pigments, that are designed for solvent printing or water-based printing. The pigments may be encapsulated or non-encapsulated. Useful metallic pigments can include, for example, zinc, copper, silver, aluminum, and alloys and combinations thereof. In other embodiments, the light blocking components include titanium dioxide and associated fillers, carbon black, mica, reflective pigments, and other polymers and minerals capable of blocking light.

According to an embodiment, the light blocking component is a particulate material. The particles of the light blocking component may have a particle size of 0.1 µm or greater, 0.5 µm or greater, 1 µm or greater, 2 µm or greater, 3 µm or greater, 4 µm or greater, or 5 µm or greater. The particle size of the particles of the light blocking component may be 100 µm or smaller, 50 µm or smaller, 25 µm or smaller, 15 µm or smaller, 12 µm or smaller, 10 µm or smaller, 8 µm or smaller, 7 µm or smaller, or 6 µm or smaller. In some embodiments, the particle size of the light blocking component is in the range of 0.1 µm to 100 µm, 1 µm to 50 µm, or 2 µm to 25 µm. The particle size referred to here is an average particle size diameter measured by laser diffraction.

Useful light blocking coating compositions can include compositions formulated for use as rotogravure inks (e.g., rotogravure solvent-based inks), flexographic inks, lithographic inks, or digital printing inks (e.g., ink jet, nanographic), for example.

In addition to the light blocking components, the light blocking composition may further include solvents such as alcohols, esters, ketones, or hydrocarbon mixtures, resins such as nitrocellulose, polyamide, vinyl, or acrylic, or additives such as waxes, plasticizers, surfactants, corrosion inhibitors, or crosslinkers to adjust properties of the composition.

The amount of light blocking component in the light blocking composition may be 3.0 wt-% or greater, 5.0 wt-% or greater, or 10 wt-% or greater. The amount of light blocking component in the light blocking composition may be 50.0 wt-% or less, 40 wt-% or less, 30 wt-% or less, or 25 wt-% or less. The amount of light blocking component in the light blocking composition may be from 3.0 wt-% to 50 wt-%, 5.0 wt-% to 40 wt-%, or from 10 wt-% to 25 wt-%. The amount of light blocking component on the label may vary based on the desired amount of light blocking and on the specific light blocking component used. In some embodiments, the light blocking component may be present on the label at 0.1 ppr to 10 ppr, from 0.2 ppr to 5 ppr, or from 0.3 ppr to 3 ppr.

The light blocking coating composition can be applied on the shrink film (or on a layer thereon) using any methods known in the art including but not limited to gravure printing (e.g., rotogravure printing), flexographic printing, and lithographic printing (e.g., offset lithographic), plateless printing (e.g., digital), post press applications, and screen printing for example. Gravure printing is the direct transfer of liquid ink to substrate from a metal image carrier. The image is lower than the surface of the image carrier base. Flexographic printing is the direct transfer of liquid ink to substrate, typically from a photopolymer image carrier although other image carriers exist. The image is raised above the surface of the image carrier base. Offset lithographic printing is the indirect transfer of paste ink to substrate from a rubber 'blanket' that is intermediate to substrate and the thin planographic metal image carrier. Some examples of plateless printing include liquid toner electrophotography, dry toner electrophotography, drop on demand inkjet, continuous inkjet, or NANOGRAPHY™.

In embodiments where the light blocking coating composition is applied to the shrink film or layer on the shrink film via rotogravure coating or printing, the light blocking coating composition can have a viscosity from 16 seconds or greater, 17 seconds or greater, 18 seconds or greater, or 19 seconds or greater, measured with a #2 Zahn Cup. The viscosity may be 40 seconds or less, 25 seconds or less, or 24 seconds or less. For example, the viscosity may range from 16 seconds to 40 seconds, from 15 seconds to 25 seconds, or even from 19 seconds to 24 seconds.

The light blocking composition may be applied onto the label at a suitable rate to result in the desired light blocking performance. When gravure coating or rotogravure coating is used, the amount of composition used may be controlled by adjusting the engraving specifications of the gravure cylinder(s). The cylinder(s) may have a cell volume of 1.0 BCM or greater, 5 BCM or greater, 10 BCM or greater, or 15 BCM or greater. The cell volume may be 2 BCM or less, 25 BCM or less, or 20 BCM or less. The cell volume may range, for example, from 1.0 BCM to 30.0 BCM, or from 5 BMC to 25 BCM. The cylinder(s) may have cell width values of 25 μm or greater, 50 μm or greater, or 100 μm or greater. The cylinder(s) may have cell width values of 300 μm or less, 250 μm or less, or 200 μm or less. The cell width values may range, for example, from 25 μm to 300 μm. The cylinder(s) may have channel widths of 1 μm or greater, 5 μm or greater, 10 μm or greater, 20 μm or greater, or 30 μm or greater. The channel widths may be 75 μm or less or 50 μm or less. The channel widths may range from 1 μm to 75 μm. The cylinder(s) may have line screen values of 25 LPI or greater, 50 LPI or greater, 100 LPI or greater, 150 LPI or greater, or 200 LPI or greater. The line screen values may be 400 LPI or less, 350 LPI or less, 300 or less, 250 or less, or 200 or less. The line screen values may range from 25 LPI to 400 LPI. According to exemplary embodiments, a desired dry coat weight may be 0.1 ppr or greater, 0.2 ppr or greater, 0.3 ppr or greater, 0.4 ppr or greater, 0.5 ppr or greater, 1 ppr or greater, 5 ppr or greater, 10 ppr or greater, or 15 ppr or greater. The desired dry coat weight may be 25 ppr or less, 20 ppr or less or 15 ppr or less. The desired dry coat weight may range from 0.1 ppr to 25 ppr, from 0.4 ppr to 15 ppr, or from 0.5 ppr to 10 ppr.

In embodiments the light blocking coating composition may be applied to the shrink film or layer on the shrink film via rotogravure coating or printing using a single (1) rotogravure cylinder having a line screen number ranging from 25 LPI to 400 LPI. In some embodiments, the light blocking coating composition may be applied to the shrink film or layer on the shrink film via rotogravure coating using a single (1) rotogravure cylinder having a line screen number of 120 LPI or using two (2) rotogravure cylinders having a line screen number of 200 LPI. The resulting dry coat weight may be in a range of 0.5 ppr to 10 ppr.

Application of the light blocking coating composition onto the shrink film or onto a layer on the shrink film forms a light blocking layer. The light blocking layer need not be constant, continuous or complete across the entirety of the shrink film. In some embodiments, the high opacity layer forms a pattern of discrete dots of light blocking component. In other embodiments, the high opacity layer forms a continuous layer of light blocking component.

Indicia Layer

Disclosed labels may also include an indicia layer applied thereon or on a layer applied onto the shrink film, including for example the high opacity layer discussed above. The indicia layer can be applied by applying one or more layers or one or more partial layers of an image-forming composition.

Useful image-forming compositions can include compositions formulated for use as rotogravure inks (e.g., rotogravure solvent-based inks), flexographic inks, lithographic inks, or digital printing inks (e.g., ink jet, nanographic), for example. Virtually any ink or combination of ink compositions that are useful in forming indicia (e.g., an image and associated text for forming a product label) can be utilized in forming an indicia layer as disclosed herein.

Suitable components of the image-forming composition are not particularly limited. Some examples of suitable components that may be used in the image-forming composition are disclosed below.

In some embodiments, the image-forming composition includes a solvent, such as an organic solvent or water or a combination thereof. The amount of solvent in the composition may be adjusted to provide a desirable color density and viscosity (e.g., as measured using a calibrated #2 Zahn cup).

The image-forming composition may include any suitable inorganic or organic pigment. Examples of the inorganic pigments include pigments such as titanium dioxide, chrome yellow, molybdate orange, iron blue, cadmium yellow, milori green, ultramarine blue, calcium carbonate, magnesium carbonate, silica aerogel or kaolin, for example. Examples of the organic pigments include Hansa yellow, lampblack, phthalocyanine, red lake C, diarylide yellow, phloxine, channel black, or rhodamine for example. Typical amounts of pigment in the ink composition for gravure printing may range from 1 wt-% to 20 wt-%.

The image-forming composition may include a binder resin, such as a polyamides, nitrocellulose, shellac, vinyl polymers, rosin esters, or acrylic polymers.

The image-forming composition can be placed on the shrink film (or on a layer thereon) using any methods known in the art including but not limited to gravure printing (e.g., rotogravure printing), flexographic printing, and lithographic printing (e.g., offset lithographic), plateless printing (e.g., digital), post press applications, and screen printing for example. Gravure printing is the direct transfer of liquid ink to substrate from a metal image carrier. The image is lower than the surface of the image carrier base. Flexographic printing is the direct transfer of liquid ink to substrate, typically from a photopolymer image carrier although other image carriers exist. The image is raised above the surface of the image carrier base. Offset lithographic printing is the indirect transfer of paste ink to substrate from a rubber 'blanket' that is intermediate to substrate and the thin planographic metal image carrier. Some examples of plateless printing include liquid toner electrophotography, dry toner electrophotography, drop on demand inkjet, continuous inkjet, or NANOGRAPHY™.

Application of the image-forming composition onto the shrink film or onto a layer on the shrink film forms an indicia layer. The indicia layer need not be constant, continuous, or complete across the entirety of the shrink film.

The indicia layer may be an ink or graphics layer, and the indicia layer may be a mono-colored or multi-colored print layer depending on the printed message and/or the intended pictorial design. These include variable imprinted data such as serial numbers, bar codes, trademarks, etc. The thickness of the indicia layer is typically in the range of about 0.5 to about 10 μm, and in one embodiment about 1 to about 5 μm, and in another embodiment about 3 μm. The inks used in the indicia layer may include commercially available water-based, solvent-based, oil-based, or energy-curable inks. Examples of commercially available inks include INXFlex Contour (a product of INX identified as an energy curable ink for shrink sleeve applications), Genesis GS (a product of INX identified as gravure solvent-based ink for shrink sleeve and roll fed applications), FlexiTech Shrink-U (a product of Flint Group identified as a flexographic solvent-based ink for shrink sleeve applications), or PluriTech Shrink-U (a product of Flint Group identified as a gravure solvent-based ink for shrink sleeve applications).

In one embodiment, the indicia layer may comprise a polyester/vinyl ink, a polyamide ink, an acrylic ink and/or a polyester ink. The indicia layer may be formed in the conventional manner by, for example, rotogravure, flexographic or lithographic printing processes, or the like, an ink composition comprising a resin of the type described above, a suitable pigment or dye and one or more suitable volatile solvents onto one or more desired areas of the shrink film or a layer formed thereon. After application of the indicia forming composition, the volatile solvent component(s) of the ink composition evaporate(s), leaving only the non-volatile ink components to form the indicia layer.

The total amount of inks on the label depends on the graphics (indicia layer), the background (e.g., white) layers, and the light blocking layer(s). The total amount of inks may be 0.5 ppr or greater, 1 ppr or greater, 5 ppr or greater, 10 ppr or greater, or 15 ppr or greater. The total amount of inks may be 30 ppr or less, 25 ppr or less, 20 ppr or less or 15 ppr or less. The total amount of inks may range from 0.5 ppr to 30 ppr.

Articles and Containers

FIG. 1A shows an article 10 (e.g., a bottle or other container) having a heat shrink label 100 applied on its outside surface. The heat shrink label 100 includes a heat shrink film 120, upon which indicia layer 125 (e.g., graphics) is disposed on one surface thereof and an opposing surface includes a high opacity layer 110 and a light blocking layer 115 on the high opacity layer 110. In this embodiment, the light blocking layer 115 is the closest to the article that the heat shrink label 100 is applied to.

Figure 1B:
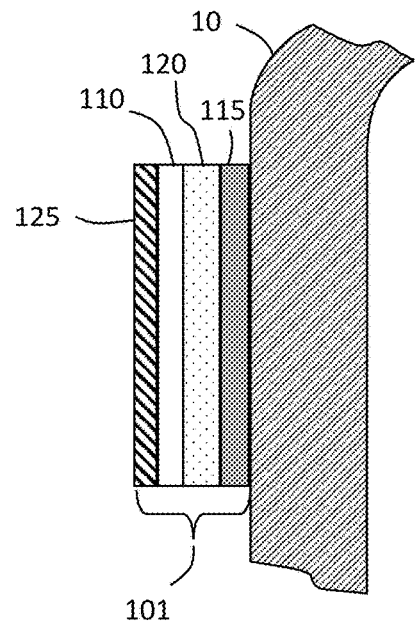
FIG. 1B schematically depicts an embodiment of a disclosed article according to an embodiment.

FIG. 1B shows an article 10 (e.g., a bottle or other container) having a heat shrink label 101 applied on its outside surface. The heat shrink label 101 includes a heat shrink film 120, upon which a light blocking layer 115 is disposed on one surface and an opposing surface having a high opacity layer 110. Disposed on the surface of the high opacity layer 110 opposite the heat shrink film 120 is an indicia layer 125. In this embodiment, the light blocking layer 115 is the closest to the article 10 that the heat shrink label 101 is applied to.

Figure 1C:
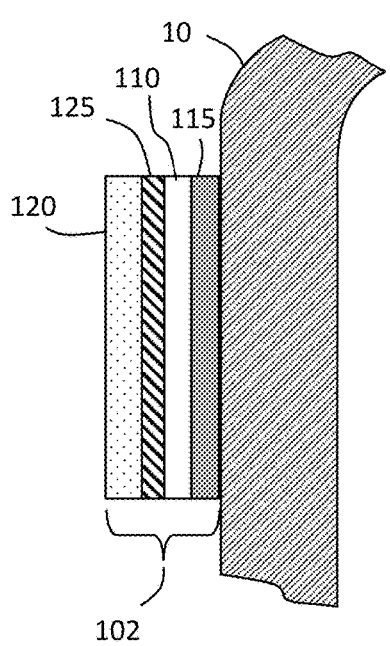
FIG. 1C schematically depicts an embodiment of a disclosed article according to an embodiment.

FIG. 1C shows an article 10 (e.g., a bottle or other container) having a heat shrink label 102 applied on its outside surface. The heat shrink label 102 includes a heat shrink film 120, upon which an indicia layer 125 is disposed on its surface, a high opacity layer 110 is disposed on the surface of the indicia layer 125, and a light blocking layer 115 is disposed on the high opacity layer 110. In this embodiment, the light blocking layer 115 is the closest to the article 10 that the heat shrink label 102 is applied to.

Figure 1D:
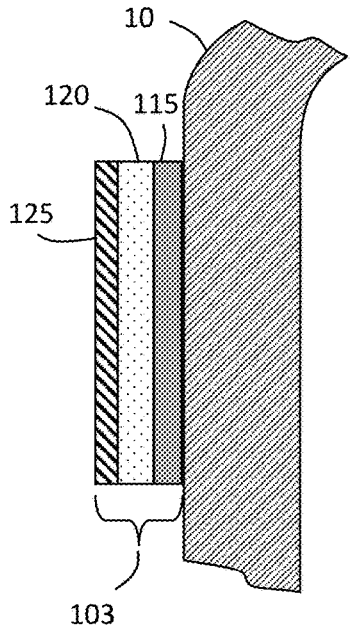
FIG. 1D schematically depicts an embodiment of a disclosed article according to an embodiment.

FIG. 1D shows an article 10 (e.g., a bottle or other container) having a heat shrink label 103 applied on its outside surface. The heat shrink label 103 includes a heat shrink film 120, upon which a light blocking layer 115 is disposed on one surface and an opposing surface has an indicia layer 125 disposed thereon. In this embodiment, the light blocking layer 115 is the closest to the article 10 that the heat shrink label 103 is applied to. Such an embodiment could be useful for example, in circumstances where it is acceptable or desirable for the background of the printed label to be dark or black.

Figure 1E:
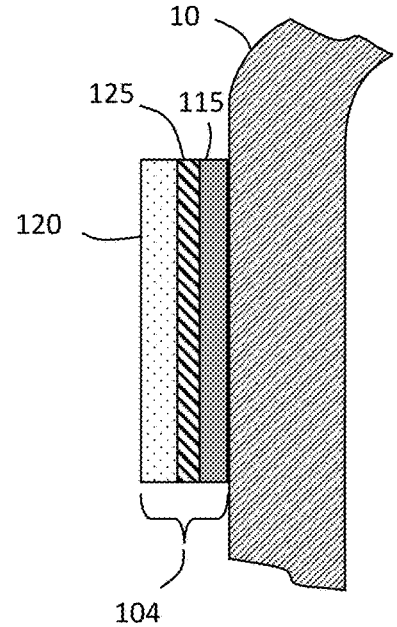
FIG. 1E schematically depicts an embodiment of a disclosed article according to an embodiment.

FIG. 1E shows an article 10 (e.g., a bottle or other container) having a heat shrink label 104 applied on its outside surface. The heat shrink label 104 includes a heat shrink film 120, upon which an indicia layer 125 is disposed on its surface and a light blocking layer 115 is disposed on the surface of the indicia layer 125. In this embodiment, the light blocking layer 115 is the closest to the article 10 that the heat shrink label 104 is applied to.

It should also be noted that additional layers not depicted in these embodiments, including tie layers, adhesion layers, primer layers, etc. could optionally be included in between or adjacent any of the depicted layers.

Figure 2:
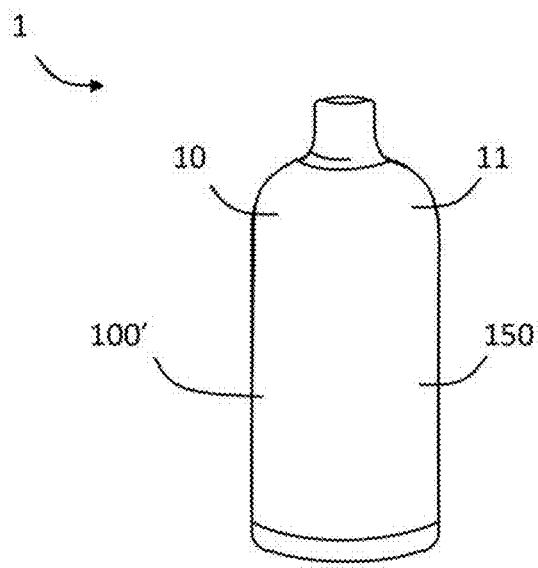
FIG. 2 is a schematic representation of an article including the label of the present disclosure, according to an embodiment.

The article or container to which the label is applied can be provided in a variety of forms or shapes. Non-limiting examples of suitable articles include containers with and without closures, such as bottles, jars, tubes, trays, lids, toys, appliances, etc. An exemplary article 1 is shown in FIG. 2. The article 1 includes a container 10 (e.g., a bottle) defining an outer surface 11. A recyclable shrink label 100' according to embodiments of this disclosure is disposed on the outer surface 11. The first side of the recyclable shrink label 100' faces the container 10 and the second side 150 faces out. The article or container may be made of any polymer (e.g., conventional polymer or biopolymer), glass, or metal such as aluminum. Examples of suitable polymeric materials include high density polyethylene (HDPE), low density polyethylene (LDPE), polyethylene terephthalate (PET), polypropylene (PP), polylactic acid (PLA), polyvinyl chloride, polycarbonate, nylon, fluorinated ethylene propylene, polystyrene, etc. The article or container may be made of a recyclable material. The article or container may be made of the same or similar polymer as the label, e.g., PET. The article or container can be made by a number of various processes known in the art, such as blow molding, injection molding, thermoforming, rotational molding and the like.

Useful containers include, for example, a bottle with a closure, a tube with a closure, a jar, or the like. In some embodiments, useful beverage containers may include one or more recyclable synthetic pigments and/or resins. Preferably the container may be processed in existing recycling streams, such as mechanical PET recycling streams. Non-limiting examples of suitable pigments and/or resins include, but not limited to, high melting point PET fines; PET comonomers; reactants or byproducts of PET polymerization; polyethylene naphthalate (PEN); terephthalic acid (TPA or PTA); bis(hydroxyethyl) terephthalate (BHET); dimethyl terephthalate (DMT); dimethyl-2,6 naphthalenedicarboxylate (NDC); and isophthalic acid (IPA).

The container or article may have a transparent appearance. In one embodiment, the container or article has a translucent appearance. The translucent appearance can be achieved by, for example, treatments of the transparent container or article, the addition of ingredients such as dyes and pearlescent agents to base polymers, the use of polypropylene and/or polyethylene that are mixed with clarifying agents. The treatments include, for example, spray coating, sandblasting, and mold surface treatment.

In one embodiment, a continuous roll label according to embodiments of the present disclosure can be applied to the article or container in an automated labeling line process. The automated labeling line process may have a line speed of at least 10 units per minute, at least 25 units per minute, at least 50 units per minute, at least 100 units per minute, or at least 250 units per minute. While there is no desirable upper limit, in practice, the automated labeling line process may have a line speed of up to 2000 units per minute, e.g., not more than 500, not more than 600, not more than 700, not more than 800, not more than 900, or not more than 1000 units per minute.

The invention is defined in the claims. However, below there is provided a non-exhaustive listing of non-limiting exemplary aspects. Any one or more of the features of these aspects may be combined with any one or more features of another example, embodiment, or aspect described herein.

According to one exemplary embodiment, clear shrink films (e.g., clear PET shrink films) with thicknesses ranging from 15 µm to 100 µm, 20 µm to 80 µm, or 25 µm to 70 µm (for example) are formed from a wide master roll. The process provides the correct width for the production orders material size requirement. Typically, artwork is printed repeatedly across the film's web width to maximize the total number of labels printed from the respective roll. The slitting step allows the film to be converted into the correct width for the seaming process. The shrink films can be printed using a rotogravure press (for example) with solvent based inks (for example). A light blocking ink can be printed in one or more print stations on either side of the film. An optional high opacity coating layer can also be applied along with the light blocking layer on either side of the film to provide a white opaque background for the label's artwork or graphics provided in the indicia layer. When clear films are used, the graphics may be printed directly onto the film, followed by the high opacity layer (e.g., a white ink) and then the light blocking layer. The graphics are visible through the clear film and are protected by the film. Alternatively, the graphics may be printed on top of the white opaque background. When the graphics are printed using a rotogravure printing press, typically the graphics are printed repeatedly across the film's web and then slit into individual label rolls. Any number of colors can be printed, each color having its own printing cylinder and ink station to apply the different inks, colors, and/or coatings. The ink is then dried with hot air convection blowers at each print station. Line screens ranging from not less than 25 LPI to up to 300 LPI can be utilized for the rotogravure printing. Viscosity readings ranging from 16-28 measured using a #2 Zahn Cup are typical for the inks. The light blocking layer can be a solvent-based or water-based composition, diluted with known solvents, and/or additives to achieve a desired viscosity for the specific printing process. Multiple engravings can be used for both the light blocking and the high opacity layer (when utilized) to afford the desired ink coverage at commercial press speeds of 100 meters per minute to 300 meters per minute, in some embodiments. All layers including the high opacity layer and the light blocking layer can shrink along with the shrink film to ensure proper adhesion and color density after being subjected to the shrink process. The layers can preferably pass an adhesion tape test using the recommended tape type for the ink system, a Sutherland ink rub tester of over 100 rubs using the 4 lb block, or both. The light blocking layer is typically designed to have low kinetic coefficients of friction (COF), for example less than 0.22.

The printed film can then be converted from a flat wound roll and formed into a continuous tube with the application of a solvent applied to one side of the film's edge. A seaming machine can fold the solvent edge side of the film onto the un-solvent coated edge, creating a chemical bond of the two sides resulting in a continuous tube of film wound into a large roll. Standard seaming speeds can range from 200 meters per minute up to 500 meters per minute for example. The seamed/tubed label rolls can then be wound into smaller length finished rolls to be shipped to a customer and applied onto intended containers, for example. The label including the light blocking can block at least 80%, at least 90%, at least 95%, at least 96%, at least 98%, at least 99%, or even almost 100% or 100% of incident light having wavelengths from 200 nanometers to 900 nanometers for example.

According to an embodiment, a method of recycling the article includes determining the type of material (e.g., type of plastic) that the container and recyclable shrink label are made of, directing the article into a corresponding recycling stream, and washing the article to remove inks and pigments from the recyclable shrink label. In some cases, the article and label include or are made of PET and can be recognized as PET and be directed into a PET recycling stream. In other cases, the article and label may include or be made of another resin and be directed to a corresponding recycling stream. In some preferred embodiments, the label applied to the article includes or is made of the same resin as the article. The washed article may be clear and not be stained or substantially stained by the light blocking component. The article may be washed in a caustic bath. The article may be chopped into pieces prior to washing. According to an embodiment, during the recycling process, the inks and coating layers cleanly separate from the heat shrink film, allowing pure resin to be recovered and processed into reusable resin.

EXEMPLARY EMBODIMENTS

Embodiment 1 is a recyclable shrink label comprising a heat shrink film having a first surface and a second surface opposite of the first surface, optionally wherein the heat shrink film has a thickness from 15 µm to 100 µm or 30 µm to 80 µm; and a light blocking layer disposed adjacent the first surface and comprising a light blocking component, the light blocking layer being constructed to block at least 80% of incident light having wavelengths in a range of 200 nm to 900 nm.

Embodiment 2 is the recyclable shrink label of embodiment 1 further comprising an indicia layer, optionally wherein the indicia layer is disposed on the first surface. The indicia layer may be immediately adjacent the first surface. The indicial layer may be immediately adjacent the light blocking layer. The indicial layer may be disposed between the first surface and another layer, e.g., a high opacity layer.

Embodiment 3 is the recyclable shrink label of embodiment 1 further comprising a high opacity layer, the high opacity layer optionally comprising a white pigment.

Embodiment 4 is the recyclable shrink label of embodiment 3, wherein the high opacity layer is disposed between the indicia layer and the light blocking layer. The high opacity layer may be immediately adjacent the indicia layer. The high opacity layer may be immediately adjacent the light blocking layer.

Embodiment 5 is the recyclable shrink label according to any of embodiments 1 to 4, wherein the heat shrink film comprises polyester, polyolefin, or a combination thereof.

Embodiment 6 is the recyclable shrink label according to any of embodiments 1 to 5, wherein the heat shrink film comprises polyethylene terephthalate (PET), polyethylene terephthalate glycol-modified (PETG or PET-G), polyvinyl chloride (PVC), polystyrene or oriented polystyrene (OPS), polylactic acid (PLA), polypropylene (PP), polyethylene (PE), or a combination thereof. The heat shrink film may consist of polyethylene terephthalate (PET), polyethylene terephthalate glycol-modified (PETG or PET-G), polyvinyl chloride (PVC), polystyrene or oriented polystyrene (OPS), polylactic acid (PLA), polypropylene (PP), polyethylene (PE), or a combination thereof. The heat shrink film may consist of only one of polyethylene terephthalate (PET), polyethylene terephthalate glycol-modified (PETG or PET-G), polyvinyl chloride (PVC), polystyrene or oriented polystyrene (OPS), polylactic acid (PLA), polypropylene (PP), or polyethylene (PE). The heat shrink film may consist of polyethylene terephthalate (PET).

Embodiment 7 is the recyclable shrink label according to any of embodiments 1 to 6, wherein the heat shrink film comprises a seam.

Embodiment 8 is the recyclable shrink label according to any of embodiments 1 to 7, wherein the heat shrink film is in the form of a sleeve or tube. The heat shrink film may be constructed to be fitted over a bottle.

Embodiment 9 is the recyclable shrink label according to any of embodiments 1 to 8, wherein when heated to 100° C., the heat shrink film contracts or shrinks by about 1% to about 90%. The heat shrink film may shrink 1% or more, 2% or more, 5% or more, 10% or more, 20% or more, 30% or more, 40% or more, or 50% or more of the size it was before heating. When heated to 100° C., the heat shrink film may shrink 90% or less, 80% or less, 75% or less, or 70% or less of the size it was before heating. The heat shrink film may shrink in the transverse direction.

Embodiment 10 is the recyclable shrink label according to any of embodiments 1 to 9, wherein when heated to 100° C., the entire recyclable shrink label contracts or shrinks by about 1% to about 90%. The entire recyclable shrink label may shrink in the transverse direction.

Embodiment 11 is the recyclable shrink label of embodiment 1, wherein the high opacity layer comprises a pigment selected from titanium dioxide ($TiO_2$), precipitated calcium carbonate (PCC), aluminum silicate, aluminum oxide (alumina), mica-based pigments coated with thin layer(s) of white pigment, or a combination thereof.

Embodiment 12 is the recyclable shrink label according to any of embodiments 1 to 11, wherein the light blocking component comprises a metal particulate, optionally wherein the metal particulate has a particle size of 0.1 μm to 100 μm.

Embodiment 13 is the recyclable shrink label according to any of embodiments 1 to 12, wherein the light blocking component comprises zinc, aluminum, copper, silver, or an alloy thereof, titanium dioxide, carbon black, mica, a reflective pigment, a polymer capable of blocking light, a mineral capable of blocking light, or a combination thereof. The light blocking component may consist of an aluminum-based component.

Embodiment 14 is the recyclable shrink label according to any of embodiments 1 to 13, wherein the light blocking layer is present in an amount of 0.5 ppr to 25 ppr. The light blocking layer may have a dry coat weight of 0.1 ppr or greater, 0.2 ppr or greater, 0.3 ppr or greater, 0.4 ppr or greater, 0.5 ppr or greater, 1 ppr or greater, 5 ppr or greater, 10 ppr or greater, or 15 ppr or greater. The dry coat weight may be 25 ppr or less, 20 ppr or less or 15 ppr or less. The dry coat weight may range from 0.1 ppr to 25 ppr, from 0.4 ppr to 15 ppr, or from 0.5 ppr to 10 ppr.

Embodiment 15 is the recyclable shrink label according to any of embodiments 1 to 14, wherein the light blocking layer comprises from 0.1 ppr to 10 ppr, from 0.2 ppr to 5 ppr, or from 0.3 ppr to 3 ppr of the light blocking component.

Embodiment 16 is the recyclable shrink label according to any of embodiments 1 to 15, wherein the label including the light blocking layer blocks at least 80%, at least 90%, at least 95%, at least 96%, at least 98%, at least 99%, or even almost 100% or 100% of incident light having wavelengths from 200 nm to 900 nm. The label including the light blocking layer may block at least 95%, at least 96%, at least 98%, at least 99%, at least 99.5%, about 100%, or 100% of incident light having wavelengths from 220 nm to 800 nm. The label including the light blocking layer may block at least 98%, at least 99%, at least 99.5%, about 100%, or 100% of incident light having wavelengths from 220 nm to 750 nm. The label including the light blocking layer may block at least 99%, at least 99.5%, about 100%, or 100% of incident light having wavelengths from 220 nm to 600 nm. The label including the light blocking layer may block at least 99%, at least 99.5%, about 100%, or 100% of incident light having wavelengths from 220 nm to 500 nm. The label including the light blocking layer may block at least 99%, at least 99.5%, about 100%, or 100% of incident light having wavelengths from 220 nm to 450 nm.

Embodiment 17 is an article comprising: a container comprising an external surface; and the recyclable shrink label of any one of embodiments 1 to 16 disposed on the container, optionally with the first surface facing the external surface of the container.

Embodiment 18 is the article according to embodiment 17, wherein the container comprises polymer, glass, metal, or a combination thereof.

Embodiment 19 is the article according of any one of embodiments 16 to 18, wherein the container comprises polyethylene terephthalate (PET), optionally wherein the container consists of polyethylene terephthalate (PET), optionally wherein the container comprises clear polyethylene terephthalate (PET).

Embodiment 20 is the article of any one of embodiments 16 to 19, wherein the recyclable shrink label comprises polyethylene terephthalate (PET), and optionally wherein the polyethylene terephthalate (PET) forms the outermost layer of the recyclable shrink label.

Embodiment 21 is the article of any one of embodiments 16 to 20, wherein the container and the recyclable shrink label comprise the same material. The container and the recyclable shrink label may comprise polyethylene terephthalate (PET).

Embodiment 22 is a method of making a label for a container, the method comprising depositing an indicia layer on a heat shrinkable film; optionally depositing a high opacity layer on the indicia layer; and depositing a light blocking composition on the indicia layer, on the heat shrinkable film, or on the high opacity layer, wherein the light blocking layer comprises one or more light blocking components, and wherein the light blocking layer is capable of blocking at least 80% of incident light having wavelengths in a range of 200 nm to 900 nm.

Embodiment 23 is a method of recycling an article comprising a container defining an external surface; and the recyclable shrink label of any one of embodiments 1 to 16 disposed on the container, optionally with the first surface facing the external surface of the container, the method comprising determining that the container and recyclable shrink label comprise polyethylene terephthalate (PET); directing the article into a polyethylene terephthalate (PET) recycling stream; and washing the article to remove inks and pigments from the recyclable shrink label.

Embodiment 24 is the method of embodiment 23, wherein the washed article is clear and is not stained by the light blocking component or other pigments or inks.

Embodiment 25 is the method of embodiment 24, wherein washing comprises washing in a caustic bath.

Embodiment 26 is the recyclable shrink label of any one of embodiments 1 to 16, further comprising an additional layer comprising an additional polymeric layer, an additional indicia layer, an adhesive layer, a slip coat, a protective top layer, another functional layer, or a combination thereof.

The present invention is illustrated by the following examples. It is to be understood that the particular examples, materials, amounts, and procedures are to be interpreted broadly in accordance with the scope and spirit of the invention as set forth herein.

Objects and advantages of this disclosure are further illustrated by the following examples, but the particular materials and amounts thereof recited in these examples, as well as other conditions and details, should not be construed to unduly limit this disclosure.

Unless otherwise noted, all parts, percentages, ratios, etc. in the Examples and the rest of the specification are by weight. These abbreviations are used in the following examples: g=gram, min=minute, hr=hour, mL=milliliter, L=liter. If not otherwise indicated in the table, below, chemicals were obtained from Sigma-Aldrich, St. Louis, MO.

EXAMPLES

Example 1

Exemplary articles were made as seen in Table 1A below. The samples were tested with a UV-Vis spectrophotometer (Shimadzu model UV-2600i) for their light blocking ability at wavelengths of 400 nm, 500 nm, 600 nm, and 700 nm. The samples were tested prior to shrinking. Samples 6 and 7 were also tested after shrinking. The results are shown in TABLE 1B.

First and second layers were high opacity layers printed using white ink. The third layer included white ink and for Samples 1-3 also blue ink. The fourth and fifth layers were light blocking layers. The light blocking component was a metallic particulate exhibiting a bronze color.

TABLE 1A

| | Samples | | | | |
|---|---|---|---|---|---|
| Sample | 1st Layer (# line screens) | 2nd Layer (# line screens) | 3rd layer (# line screens and pigment color) | 4th Layer - Light blocking (# line screens) | 5th Layer - Light blocking (# line screens) |
| 1 | 120 | 150 | 150 white + blue | — | — |
| 2 | 120 | 150 | 150 white + blue | 200 | — |
| 3 | 120 | 150 | 150 white + blue | 200 | 175 |
| 4 | 150 | 150 | 120 white | 175 | 200 |
| 5 | 150 | 150 | 120 white | 175 | — |
| 6 | 150 | 150 | 120 white | 200 | — |
| 7 | 120 | 150 | 150 white | 175 | 200 |

TABLE 1B

| | Light Blocking Percentage at Various Wavelengths | | | |
|---|---|---|---|---|
| Sample | 400 nm (% Light blocked) | 500 nm (% Light blocked) | 600 nm (% Light blocked) | 700 nm (% Light blocked) |
| Black + White Film | 100.0 | 99.7 | 99.4 | 99.0 |
| 1 | 97.2 | 79.0 | 79.9 | 71.9 |
| 2 | 99.1 | 93.6 | 92.9 | 89.8 |
| 3 | 99.7 | 97.9 | 97.3 | 96.1 |
| 4 | 99.5 | 96.9 | 95.2 | 94.4 |
| 5 | 98.6 | 93.6 | 91.1 | 89.7 |
| 6 | 99.5 | 93.8 | 91.5 | 89.9 |
| 6 - shrunk | 99.7 | 95.6 | 93.6 | 92.3 |
| 7 | 99.6 | 98.5 | 97.5 | 97.2 |
| 7-shrunk | 99.9 | 99.5 | 99.1 | 98.9 |

Figure 3:
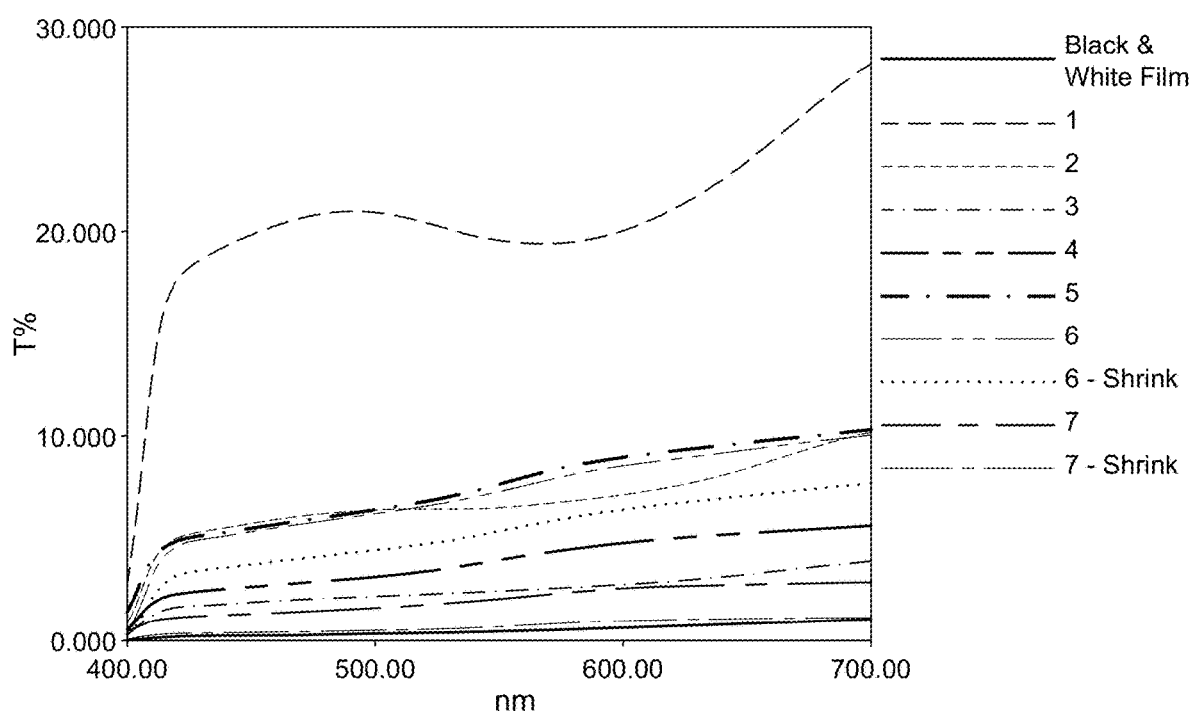
FIGS. 3-5 are graphical representations of data from Example 1.
Figure 4:
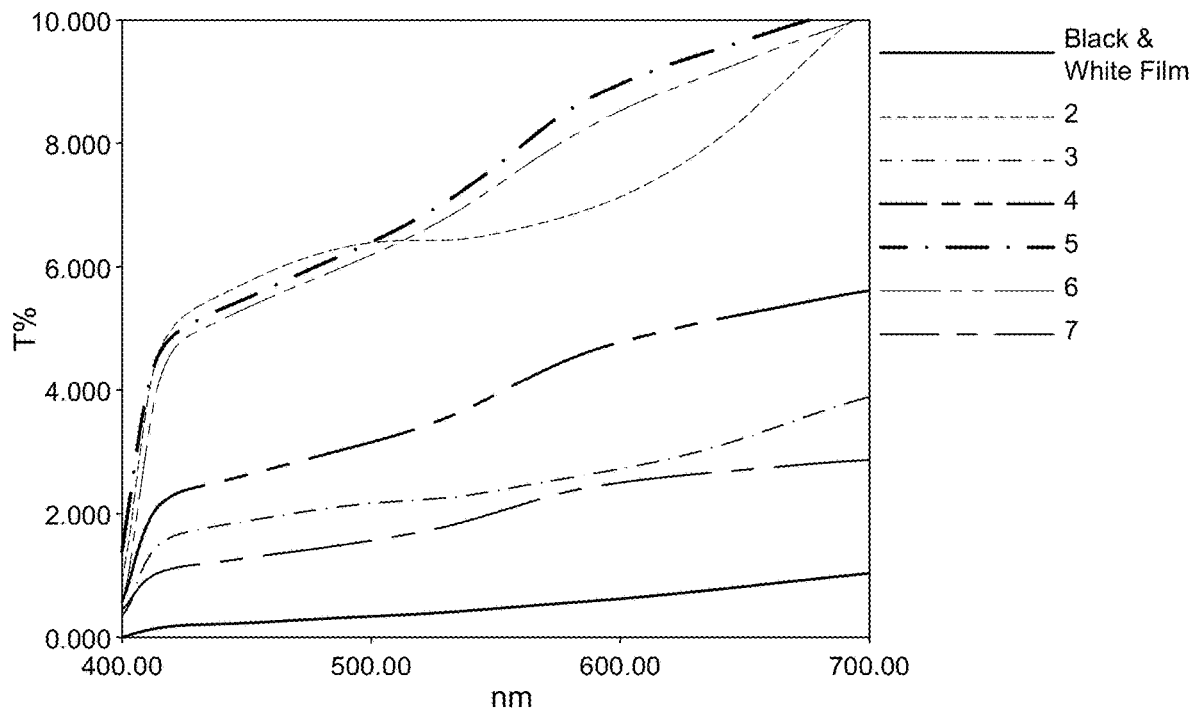
Figure 5:
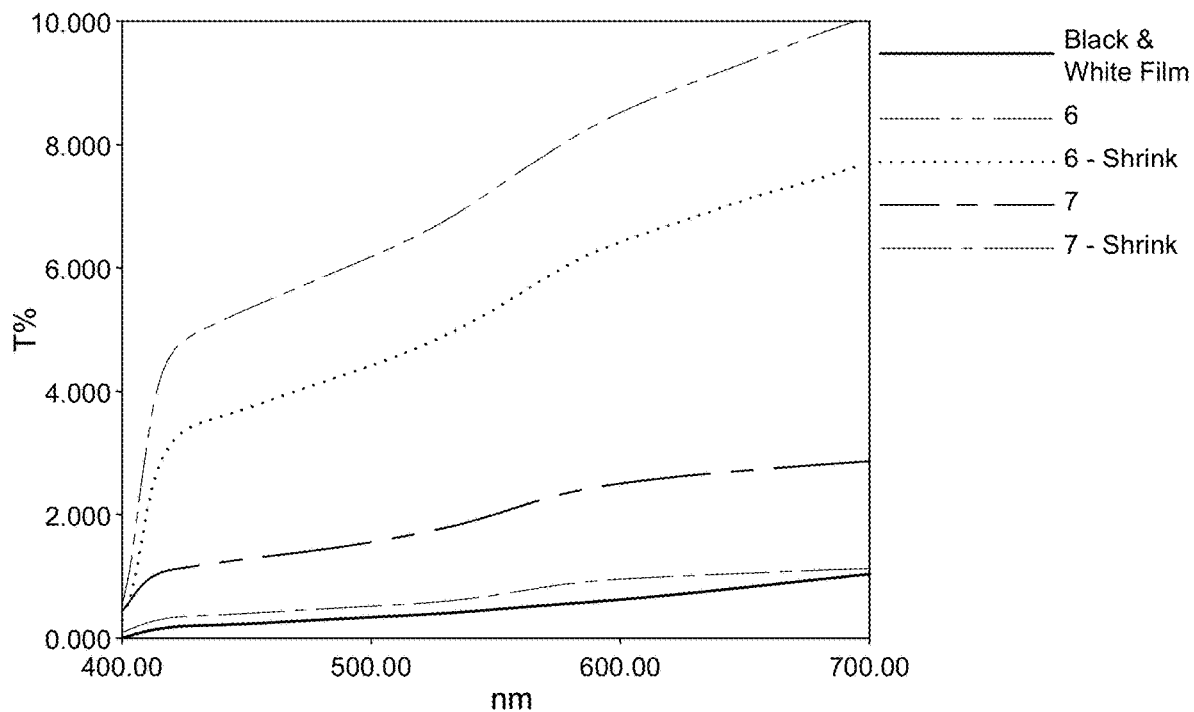

FIGS. 3-5 show UV-Vis spectra of the samples. FIG. 3 shows the transmittance of each of the samples in TABLE 1B. FIG. 4 is a close-up of the lower section, showing samples 2-7. FIG. 5 compares samples 6 and 7 (before shrinking) to samples 6—shrunk and 7—shrunk.

Example 2

Samples with various color graphics were prepared to evaluate the effect of the color on the light blocking and the effect of the light blocking layer on the appearance of the color.

Samples were prepared using APR certified recyclable 40 μm clear PET shrink sleeve film. The inks were printed onto the film with solvent rotogravure inks. The film was first printed with a single color (yellow, red, or reflex blue). The printed color was then overlaid with three layers of white ink. Over the white ink layers, a light blocking composition was applied by a rotogravure cylinder that had a volume of 12 BCM (billion cubic micron per square inch, or $10^9$ $\mu m^3/inch^2$).

The samples were tested with a UV-Vis spectrophotometer (Shimadzu model UV-2600i) or their light blocking ability (prior to shrinking) at wavelengths ranging from 220 nm to 900 nm. The results are shown in TABLE 2. The samples were also visually observed to evaluate the effect of the light blocking layer on the appearance of the color.

TABLE 2

| | Light blocking. | | |
|---|---|---|---|
| Wavelength (nm) | Yellow film | Red film | Blue film |
| 220 | 100.0% | 100.0% | 100.0% |
| 300 | 100.0% | 100.0% | 100.0% |
| 400 | 100.0% | 100.0% | 100.0% |
| 500 | 99.8% | 99.9% | 99.9% |

TABLE 2-continued

| | Light blocking. | | |
|---|---|---|---|
| Wavelength (nm) | Yellow film | Red film | Blue film |
| 600 | 98.6% | 99.1% | 100.0% |
| 700 | 98.3% | 98.5% | 99.9% |
| 800 | 98.2% | 98.3% | 98.6% |
| 900 | 97.9% | 98.2% | 98.3% |

It was observed that lower L* value (darker color on the L*a*b*scale) inks slightly improved light blocking at certain wave lengths (e.g., 600-700 nm). It was also observed that the light blocking composition had an effect on the visual appearance of the color. It was concluded that more saturated or more opaque colors may be used to produce the intended color effect.

Example 3

The impact of the thickness of the light blocking layer on the ability to block light was evaluated. Various samples were prepared using APR certified recyclable 40 μm clear PET shrink sleeve film. The inks were printed onto the film with solvent rotogravure inks. The film was first printed with three layers of white ink. Over the white ink layers, various thicknesses of a light blocking composition were applied, using a "banded" rotogravure cylinder (each printing lane has different engraving specifications) with lanes having volumes ranging from 5 BCM to 12 BCM (billion cubic micron per square inch, or $10^9$ $\mu m^3/inch^2$). The light blocking composition included a metallic light blocking component having a gray or silver appearance.

The samples were tested with a UV-Vis spectrophotometer (Shimadzu model UV-2600i) for their light blocking ability (prior to shrinking) at wavelengths ranging from 220 nm to 900 nm. The results are shown in TABLE 3. The samples were also visually observed to evaluate the effect of the light blocking layer on the appearance of the white layer printed before it. It was observed that the thickness of the light blocking layer had an inverse correlation with the lightness of the white. As the thickness of the light blocking layer increased, the lightness of the white decreased. As the thickness of the light blocking layer decreased, the lightness of the white layer increased.

TABLE 3

| | Light blocking | | | | | |
|---|---|---|---|---|---|---|
| Wavelength (nm) | 5 BCM | 6 BCM | 7 BCM | 8 BCM | 10 BCM | 12 BCM |
| 220 | 99.9% | 99.9% | 100.0% | 100.0% | 100.0% | 100.0% |
| 300 | 100.0% | 100.0% | 100.0% | 100.0% | 100.0% | 100.0% |
| 400 | 99.8% | 99.8% | 99.9% | 99.9% | 100.0% | 100.0% |
| 500 | 95.4% | 96.1% | 97.6% | 98.1% | 99.1% | 99.6% |
| 600 | 94.5% | 95.3% | 97.1% | 97.7% | 98.9% | 99.5% |
| 700 | 93.5% | 94.4% | 96.6% | 97.3% | 98.6% | 99.4% |
| 800 | 92.6% | 93.7% | 96.2% | 96.9% | 98.5% | 99.3% |
| 900 | 91.8% | 93.0% | 95.7% | 96.5% | 98.3% | 99.2% |

Example 4

The light blocking performance of labels prepared according to the present disclosure was compared to commercially available light blocking labels.

The sample labels were prepared similar to Example 3 by a "banded" rotogravure cylinder that had lanes engraved with 12 BCM, 10 BCM, 8 BCM, and 6 BCM volumes to apply the light blocking layer. The comparative samples were two (2) different commercially available white PET films, each printed on one side with black ink by a rotogravure cylinder that had a volume of 10 BCM. The comparative samples are non-recyclable.

The samples were tested as described in Example 3. The results are shown in TABLE 4. above.

TABLE 4

| | Light blocking | | | | | |
|---|---|---|---|---|---|---|
| Wavelength (nm) | Comparative Sample 1 | Comparative Sample 2 | 12 BCM | 10 BCM | 8 BCM | 6 BCM |
| 220 | 100.0% | 100.0% | 100.0% | 100.0% | 100.0% | 100.0% |
| 300 | 100.0% | 100.0% | 100.0% | 100.0% | 100.0% | 100.0% |
| 400 | 99.9% | 99.9% | 99.8% | 99.8% | 99.7% | 99.5% |
| 500 | 99.8% | 99.6% | 98.3% | 98.0% | 97.8% | 96.0% |
| 600 | 99.5% | 99.3% | 98.0% | 97.6% | 97.0% | 94.5% |
| 700 | 99.1% | 98.8% | 97.7% | 97.2% | 96.3% | 93.4% |
| 800 | 98.4% | 97.9% | 97.4% | 96.9% | 95.8% | 92.4% |
| 900 | 97.8% | 97.0% | 97.2% | 96.6% | 95.3% | 91.7% |

It was observed that the labels according to the present disclosure provided comparable light blocking properties to the commercially available labels when the light blocking layer was thicker. When the light blocking layer was less thick, the light blocking properties decreased as seen in Example 3.

It was observed upon visual comparison that the labels according to the present disclosure exhibited better lightness properties.

Example 5

The light blocking performance of labels prepared according to the present disclosure was compared to comparative labels that are used to block light and are commercially available in the market.

The sample label was prepared using APR certified recyclable 40 μm clear PET shrink sleeve film. The inks were printed onto the film with solvent rotogravure inks. The film was first printed with an indicia layer (four different colored inks). The printed indicia layer was then overlaid with three layers of white ink. Over the white ink layers, a light blocking composition was applied by a rotogravure cylinder that had a volume of 12 BCM (billion cubic micron per square inch, or $10^9$ μm$^3$/inch$^2$).

The comparative samples (Comparative Sample 3 and Comparative Sample 4) were two (2) different printed labels that are currently used for a product that needs to block light to protect its contents. Comparative Sample 3 was printed on white film, had graphics that were almost identical to the sample label, and black print on the inside to help block light. Comparative Sample 4 was printed on white film, had graphics that were different than the sample label or Comparative Sample 3, and had black print on the inside to help block light. The comparative samples are non-recyclable.

The samples were tested as described in Example 3. The light blocking results are shown in TABLE 5 below.

TABLE 5

Light blocking

| Wavelength (nm) | Sample label | Comparative Sample 3 | Comparative Sample 4 |
|---|---|---|---|
| 220 | 100.0% | 100.0% | 100.0% |
| 300 | 100.0% | 100.0% | 100.0% |
| 400 | 99.9% | 99.8% | 99.8% |
| 500 | 99.3% | 99.7% | 99.7% |
| 600 | 99.1% | 99.5% | 99.5% |
| 700 | 98.9% | 99.3% | 99.3% |
| 800 | 98.8% | 99.1% | 99.1% |
| 900 | 98.7% | 98.9% | 98.9% |

It was observed that the labels according to the present disclosure provided comparable light blocking properties as the commercially available labels.

It was observed upon visual comparison that the labels according to the present disclosure exhibited better lightness properties with the colors of the indicia layer appearing more vibrant.

Example 6

The ability of typical recycling equipment to correctly sort bottles with labels according to the present disclosure was tested to test compatibility with APR sorting requirements. The samples were tested according to APR Document number SORT-B-03, Evaluation of Sorting Potential for Plastic Articles Utilizing Metal, Metalized, or Metallic Printed Components, published on May 15, 2018. Further guidance can be found in APR documents PET-CG-02, Critical Guidance Protocol for Clear PET Articles with Labels and Closures; and PET-B-02, Benchmark Evaluation for Clear PET Articles with Labels and Closures.

Labels were prepared as described in Example 2 with 12 BCM a light blocking layer. The labels were applied onto clear PET bottles. The bottles with labels were tested in an Eriez Xtreme Test Line in both vertical and horizontal orientation. Before testing begins candidate articles are compressed. Articles are the determined to be ferrous or not. Ferrous articles are tested with a plate magnet. Articles are then passed through a tunnel-style metal detector at vertical and horizontal orientations and the spherical equivalent of the of the sample is calculated. Sphere sizes of 0-2 mm indicate a recyclable sample.

The sample was found to exhibit a sphere size of 0.5 mm in the portrait orientation and 0.6 mm in the landscape orientation.

The bottles were also run through an eddy current sorter and an NIR sorter that is used to identify PET articles. The bottles were recognized as PET by the NIR sorter The bottles were also not caught by the eddy current sorter. In other words, the bottles passed the recycling criteria for plastic (e.g., PET) bottles.

The complete disclosure of all patents, patent applications, and publications, and electronically available material cited herein are incorporated by reference. In the event that any inconsistency exists between the disclosure of the present application and the disclosure(s) of any document incorporated herein by reference, the disclosure of the present application shall govern. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A recyclable shrink label comprising:
a heat shrink film comprising polyethylene terephthalate (PET) and having a first surface and a second surface opposite of the first surface, the heat shrink film having a thickness from 15 μm to 100 μm; and
a light blocking layer disposed adjacent the first surface and comprising a light blocking component, the light blocking layer being constructed for the recyclable shrink label to block at least 80% of incident light having wavelengths in a range of 200 nm to 900 nm, wherein the light blocking component comprises a particulate having a particle size of 0.1 μm to 100 μm, wherein the particulate comprises metal, metal oxide, a reflective pigment, carbon black, mica, or a combination thereof, and
wherein the recyclable shrink label is recyclable with a PET container.

2. The recyclable shrink label of claim 1 further comprising an indicia layer.

3. The recyclable shrink label of claim 1 further comprising a high opacity layer comprising a white pigment.

4. The recyclable shrink label of claim 3, wherein the recyclable shrink label comprises an indicia layer and wherein the high opacity layer is disposed between the indicia layer and the light blocking layer.

5. The recyclable shrink label of claim 1, wherein the heat shrink film consists of polyethylene terephthalate (PET).

6. The recyclable shrink label according to claim 1, wherein the recyclable shrink label is in a form of a sleeve or tube.

7. The recyclable shrink label according to claim 6, wherein the heat shrink film comprises a seam.

8. The recyclable shrink label according to claim 1, wherein when heated to 100° C., the heat shrink film contracts or shrinks by about 1% to about 90%.

9. The recyclable shrink label according to claim 1, wherein when heated to 100° C., the entire recyclable shrink label contracts or shrinks by about 1% to about 90%.

10. The recyclable shrink label according to claim 3, wherein the high opacity layer comprises a pigment selected from titanium dioxide (TiO$_2$), precipitated calcium carbonate (PCC), aluminum silicate, aluminum oxide (alumina), mica-based pigments coated with thin layer(s) of white pigment, or a combination thereof.

11. The recyclable shrink label according to claim 1, wherein the light blocking component comprises zinc, aluminum, copper, silver, or an alloy thereof, titanium dioxide, carbon black, mica, a reflective pigment, a polymer capable of blocking light, a mineral capable of blocking light, or a combination thereof.

12. The recyclable shrink label according to claim 1, wherein the light blocking layer is present in an amount of 0.5 ppr to 25 ppr relative to the recyclable shrink label.

13. The recyclable shrink label according to claim 1, wherein the light blocking layer comprises from 0.1 ppr to 10 ppr of the light blocking component.

14. An article comprising:
   a container comprising polyethylene terephthalate (PET) and defining an external surface; and
   the recyclable shrink label of claim 1 disposed on the container.

15. The article according to claim 14, wherein the first surface of the heat shrink film faces the external surface of the container.

16. The recyclable shrink label according to claim 2, wherein the indicia layer is disposed on the first surface.

17. The recyclable shrink label according to claim 8, wherein the heat shrink film contracts or shrinks by about 1% to 90% in a transverse direction.

18. The recyclable shrink label according to claim 1, wherein the heat shrink film comprises crystallizable polyethylene terephthalate (PET).

19. A recyclable shrink label comprising:
   a heat shrink film comprising polyethylene terephthalate (PET) and having a first surface and a second surface opposite of the first surface, the heat shrink film having a thickness from 15 μm to 100 μm;
   a light blocking layer disposed adjacent the first surface and comprising a light blocking component, the light blocking layer being constructed for the recyclable shrink label to block at least 80% of incident light having wavelengths in a range of 200 nm to 900 nm, and
   a high opacity layer comprising a white pigment,
   wherein the recyclable shrink label is recyclable with a PET container.

* * * * *